Figure 1:
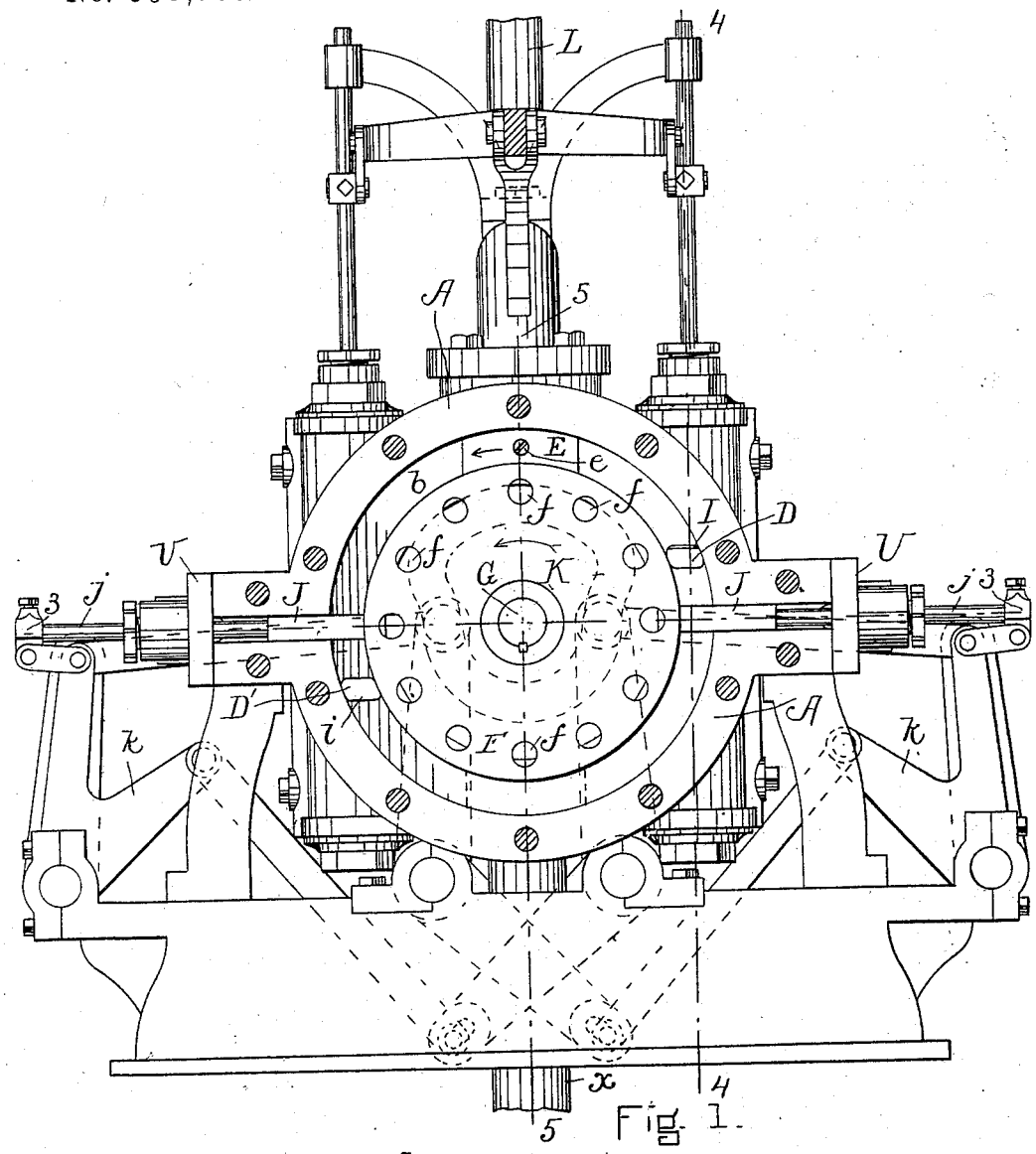

(No Model.)　　　　　　　　　　　　　　　　5 Sheets—Sheet 1.
F. P. CANFIELD.
COMPOUND ROTARY STEAM ENGINE.
No. 596,737.　　　　　　　　　　　Patented Jan. 4, 1898.

WITNESSES.
Matthew M. Blunt,
N. K. Baker

INVENTOR.
Felix P. Canfield
by N. C. Reeves
ATT'Y.

(No Model.)  5 Sheets—Sheet 2.

F. P. CANFIELD.
COMPOUND ROTARY STEAM ENGINE.

No. 596,737.  Patented Jan. 4, 1898.

WITNESSES.  INVENTOR.
Matthew M. Blunt.  Felix P. Canfield
N. T. Baker  by A. N. Spencer
 ATT'Y (No Model.)

5 Sheets—Sheet 3.

F. P. CANFIELD.
COMPOUND ROTARY STEAM ENGINE.

No. 596,737. Patented Jan. 4, 1898.

WITNESSES.
Matthew M. Blunt.
N. T. Baker

INVENTOR.
Felix P. Canfield
by P. N. Reeves
ATT'Y.

(No Model.)  5 Sheets—Sheet 4.

F. P. CANFIELD.
COMPOUND ROTARY STEAM ENGINE.

No. 596,737. Patented Jan. 4, 1898.

WITNESSES.

INVENTOR.

ATT'Y (No Model.)  5 Sheets—Sheet 5.

F. P. CANFIELD.
COMPOUND ROTARY STEAM ENGINE.

No. 596,737.  Patented Jan. 4, 1898.

WITNESSES.
Matthew M. Blunt,
N. K. Baker

INVENTOR.
Felix P. Canfield
by A. H. Bewer,
ATT'Y.

UNITED STATES PATENT OFFICE.

FELIX P. CANFIELD, OF BOSTON, MASSACHUSETTS.

COMPOUND ROTARY STEAM-ENGINE.

SPECIFICATION forming part of Letters Patent No. 596,737, dated January 4, 1898.

Application filed August 5, 1896. Serial No. 601,696. (No model.)

*To all whom it may concern:*

Be it known that I, FELIX P. CANFIELD, of Boston, in the county of Suffolk and State of Massachusetts, have invented certain new and useful Improvements in Compound Rotary Steam-Engines, of which the following, taken in connection with the accompanying drawings, is a specification.

The object of this invention is to furnish a more compact and efficient rotary engine than any hitherto known and to provide for compounding or using the steam expansively by means of new devices and combinations of parts.

Two annular steam-chambers of equal diameter are employed, one having about twice the breadth of the other. The shaft which passes through the axial centers of these chambers has fixed upon it two circular disks, each of which carries, peripherally, the rotating piston-block for one of the chambers, said blocks being placed diametrically opposite to each other and balanced. Each block is preferably made in two parts, secured together as one through a peripheral extension of the carrying-disk, and each disk has a series of perforations for the free passage of any steam which may reach either of its sides, such steam draining into the exhaust-passage. There are two simultaneously-moving valves working in valve-chambers between the two steam-chambers, each valve admitting live steam first to the narrowest chamber, and then, after it has done its work there, transferring it to the expansion-chamber, where it acts on the broader piston-block before passing to the exhaust-chamber, located between the valves and also between the planes of the annular steam-chambers. There are two inlet-ports where steam alternately enters each chamber, one leading from each valve. The valves reciprocate vertically, being actuated by an eccentric with a pitman-and-lever connection, steam passing freely through the hollow interior of the valves, entering the first steam-chamber above the top of one valve on its downstroke and beneath the lower end of the other valve on the upstroke, and passing thence through spiral peripheral channels in the moving valve to the expansion-chamber, where it acts expansively on the piston-block therein and escapes through other spiral valve-channels to the exhaust. Two sliding abutments move in and out radially across the annular space which forms each steam-chamber, each abutment moving inwardly and acting as a back-stop just as the piston-block passes and the steam begins to enter and moving outwardly in time to let the piston-block pass again. These abutments are actuated mechanically by crank-levers and connecting-rods operated by a grooved cam on the main shaft with pitman and rock-shafts, and they are pressed up closely against the inner wall of the annular steam-chamber by live steam, which occupies all the inclosed spaces behind said abutments and passes freely therein as the parts reciprocate. Drainage is provided for at the bottom of these inclosed spaces and at the lower edges of the annular chamber or the carrying-disks.

The engine-body is a single shell or casing cored out centrally for the exhaust-chamber, recessed circularly each side thereof, the annular flanges surrounding such recesses forming part of the inner walls of the two annular steam-chambers, and adjustable rings mounted on corresponding circular flanges formed on removable caps comprising the remaining part of such inner walls. The peripheral wall and the innermost edge walls of said steam-chambers are formed in and by such shell or casing, while the outermost—that is, the front and back walls of such chambers farthest from the exhaust-chamber—are formed by the inner faces of said caps. The spring-pressed ring connected with the annular flange of each cap is furnished with an adjusting-screw extending through the cap, such ring bearing lightly on the disk which carries the piston-block to prevent leakage of steam.

The main shaft, on which the piston-carrying disks are mounted, extends transversely through the exhaust-chamber and through a sleeve connecting the side walls of said chamber, and it has bearings in tubular extensions of the front and rear removable caps, which are bolted to the shell or casing constituting the engine-body. Tapered bushings are introduced into these bearings and furnished with adjusting-screws to insure tight joints.

Figure 6:
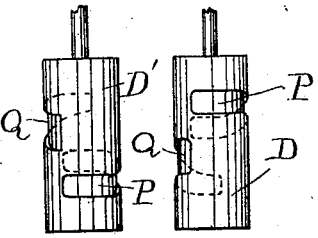
Figure 2:
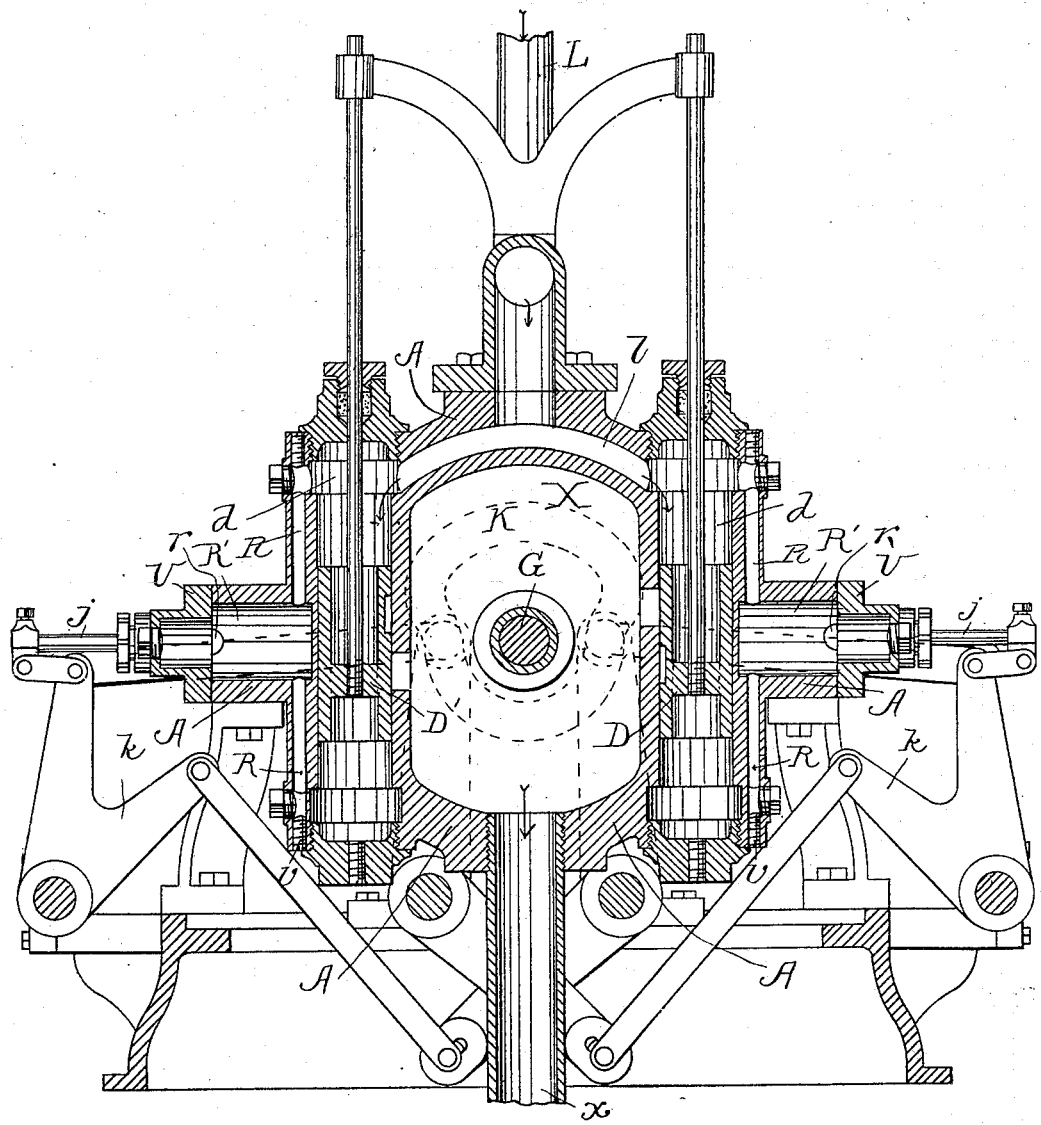
Figure 3:
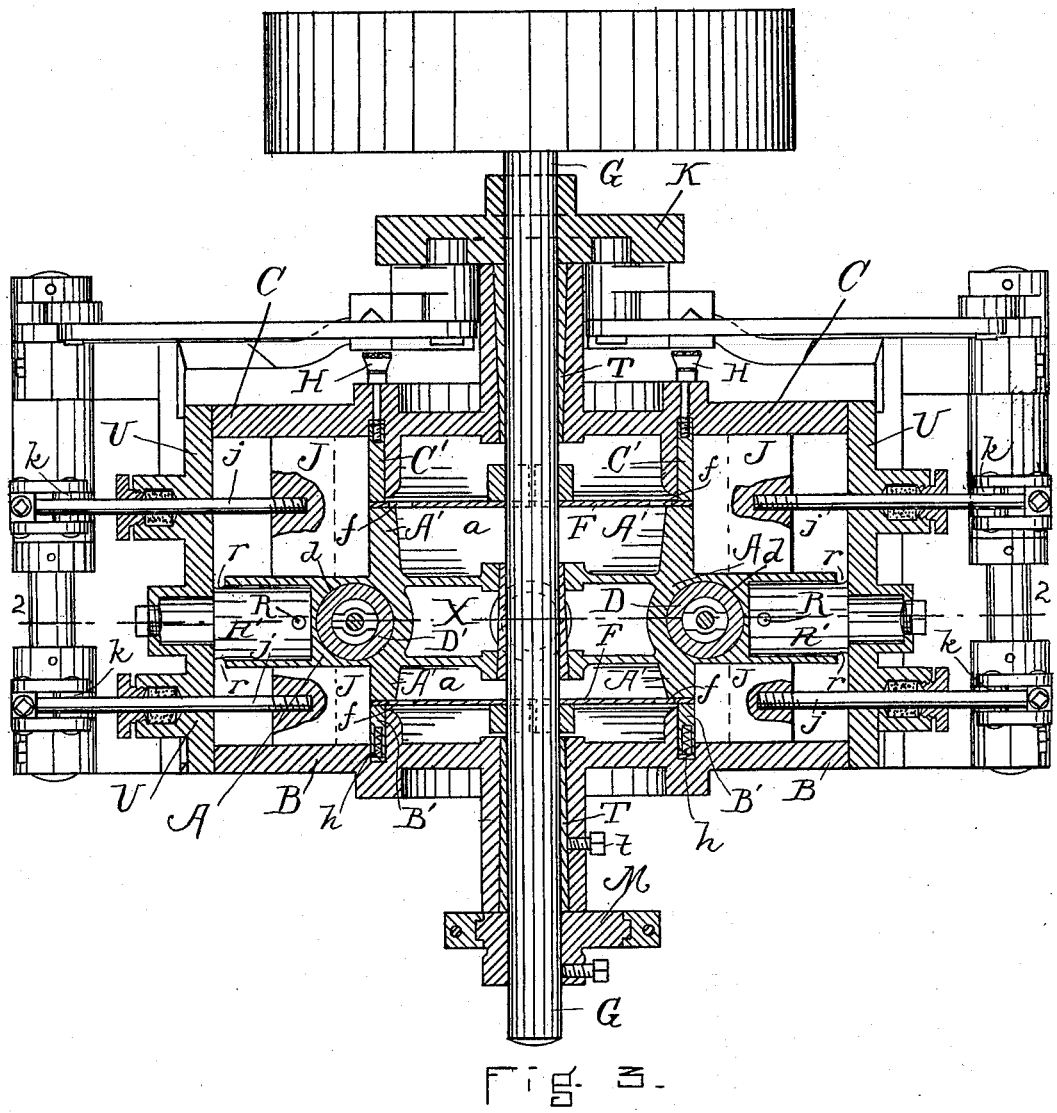
Figure 4:
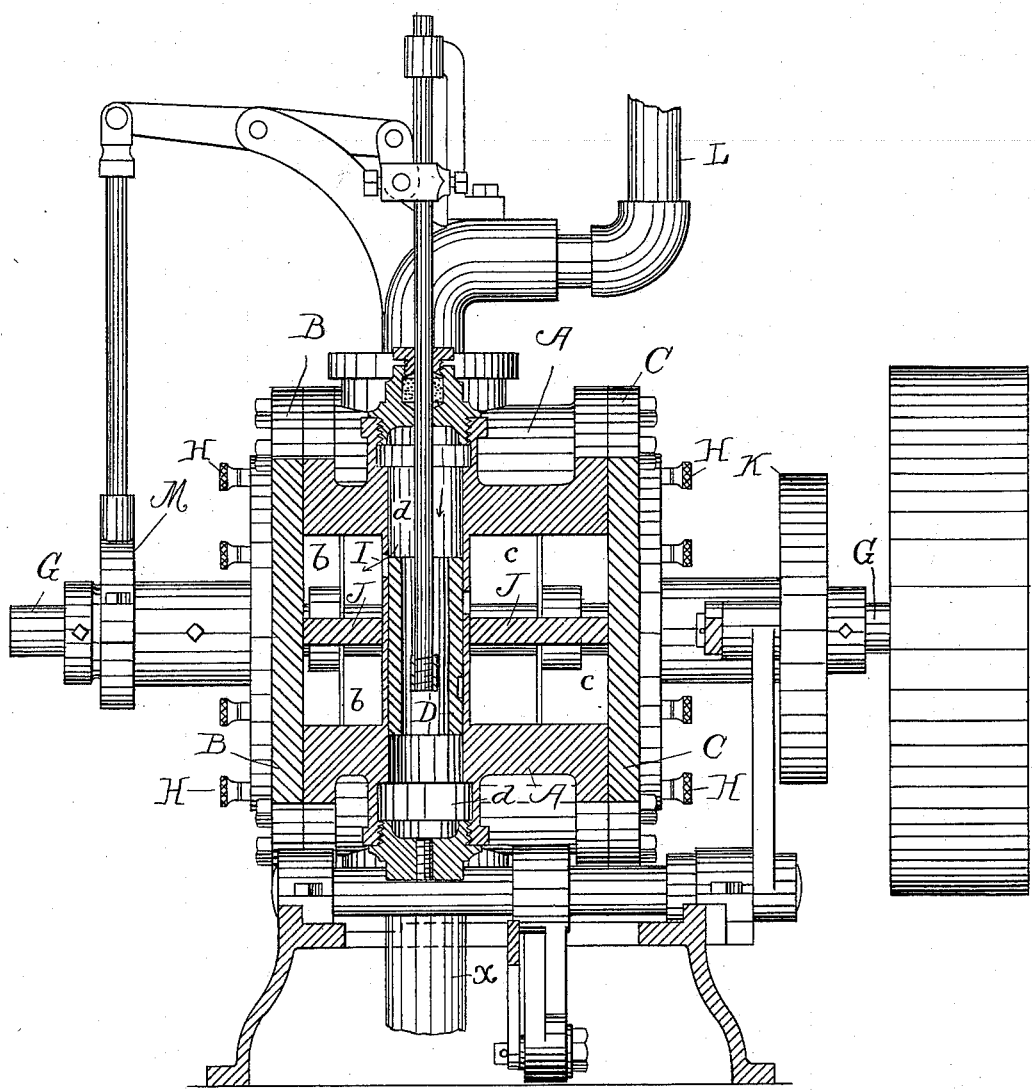
Figure 5:
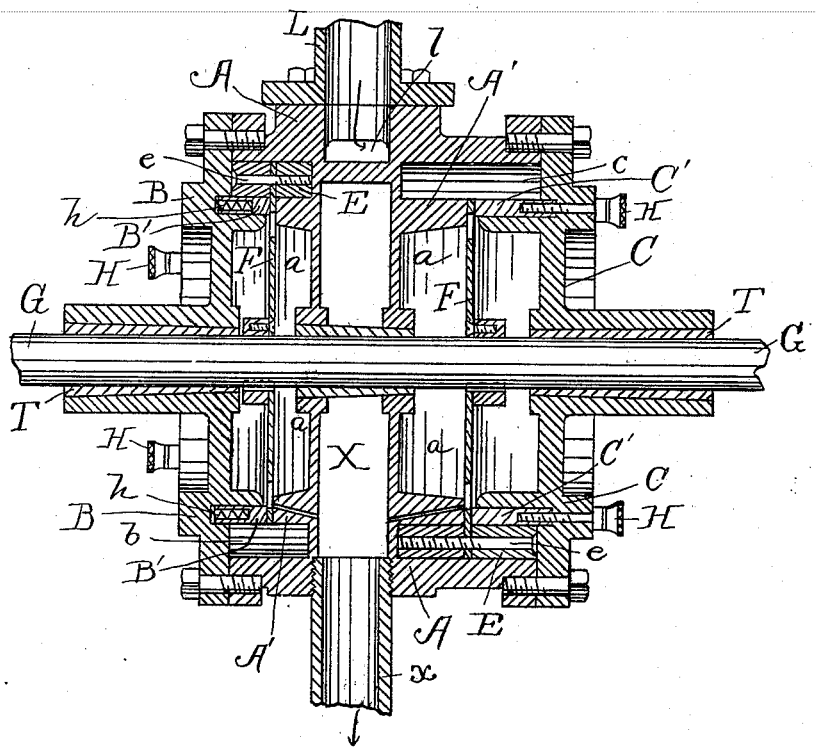

In the drawings, Figure 1 is a front elevation of my improved engine, the front cap being removed and the bolts in section. Fig. 2 is a vertical section taken through the valves on line 2 2 of Fig. 3. Fig. 3 is a horizontal section in the plane of the main shaft. Fig. 4 is vertical section taken on line 4 4 of Fig. 1 at right angles to plane of section Fig. 2. Fig. 5 is a detail in vertical section on line 5 5 of Fig. 1. Fig. 6 is an elevation of the valves detached.

A represents the shell or casing which constitutes the body of the engine. It is a single casting having a central cavity X, serving as the exhaust-chamber, and circular lateral recesses $a\ a$ each side thereof. Two annular steam-chambers $b$ and $c$ are also formed in said casting, one in the front and the other in the rear face thereof, surrounding the recesses $a\ a$ and adapted to receive steam from valves D, which reciprocate vertically in cylindrical valve-chambers $d$, located between said steam-chambers and at each edge of the exhaust-chamber. The annular steam-chambers $b$ and $c$ are deeply-cut grooves formed midway between the generally cylindrical exterior of the shell and the circular recesses $a\ a$. Annular flanges A' extend outwardly, forming part of the inner wall of said chambers.

B and C, Figs. 3, 4, and 5, are removable caps bolted to the front and rear of the engine-body A and formed with circular recesses corresponding to the recesses $a\ a$ in said body, and an inwardly-extending annular flange on each cap carries an adjustable ring B' C', which coöperates with the flange A' on the casting to make up the inner walls of the chambers $b$ and $c$ parallel to the peripheral walls thereof. (See especially Fig. 5.)

Each annular steam-chamber $b\ c$ has a curved piston-block E, exactly filling and transversely fitting it and adapted to be propelled by the steam admitted behind it. Each of these piston-blocks is mounted on a carrying-disk F, keyed to the main shaft G, and in Fig. 5 each is shown as made in two parts secured together by screws $e$, passing through a peripheral extension on said disk, which affords a convenient means of attachment. The disk is seen in elevation in Fig. 1, where numerous perforations $f$ are shown, permitting free passage to any steam which may leak into the spaces on either side of the disk, thus equalizing the slight pressure.

The margins of disks F revolve between the adjacent circular flanges A' on the shell or casing and the adjustable rings B' C' on the removable caps with just sufficient pressure to prevent leakage of steam ordinarily. The adjustable rings are pressed forward by inclosed spiral springs $h$ and held back or exactly adjusted by screws H with milled heads. (See Figs. 3 and 5.)

J J, Fig. 3, represent four sliding abutments, two for each chamber, having a reciprocating movement horizontally across the annular steam-chambers $b$ and $c$, moving inwardly to serve as a back-stop immediately after the piston-block E has passed and moving outwardly in time for the spent steam to escape and the piston-block to pass again. These sliding abutments are provided with piston-rods $j$ and are actuated by a grooved cam K on the main shaft G with intermediate pivoted crank-levers $k$ and connecting-rods. (See Figs. 1 and 2, where the cam-groove and parts of the connecting devices are shown in dotted lines.) The abutments occupy but for a moment the position shown in Fig. 3, where all are closed, as two of them begin to open (one in each chamber $b\ c$) the instant the cam turns, its groove carrying the lever-stud away from shaft G. The piston-rods $j\ j$, connected to the sliding abutments, reciprocate through stuffing-boxes formed on end plates U, Figs. 1 and 3.

Steam enters the engine from above through pipe L and passes thence both to right and left through passages $l$ to the valve-chambers $d$, as in Fig. 2. The valves D D' are reciprocated vertically by a suitable lever connection with an eccentric M on the main shaft G. (See Fig. 4.) The valves are open centrally, so that the steam is both above and below them and moves freely through them. There are two inlets I $i$ to the narrow live-steam chamber $b$, one, I, as shown in Fig. 4, at the top of the descending valve D, and the other, $i$, diametrically opposite thereto, opening beneath the other valve D' as it ascends. Both these inlet-ports are seen in Fig. 1, the first being shown partly open, while the other is closed. The expansion-chamber $c$ is similarly provided with two inlet-ports, but the steam enters it through peripheral passages P, Fig. 6, leading partially around the valves D D', and through these winding passages the steam, first used in chamber $b$, enters, and in this larger chamber acts expansively upon the broader piston-block therein. The valve first mentioned takes steam from chamber $b$ for transfer through the passage P into the chamber $c$ during the upward movement of said valve and while its peripheral passage is coincident with the inlet I. The same steam thus passes into and out of chamber $b$ at each revolution through the port I. Similarly through the port $i$ steam enters said chamber $b$ from beneath the other valve D' on its upward stroke, and through its winding peripheral passage it escapes thence through same port $i$ into chamber $c$ during the downward movement of the valve D'. Each valve also has a winding peripheral passage Q, through which at the proper time the steam used expansively in chamber $c$ escapes into the exhaust-chamber X, and thence downwardly by pipe $x$ to the open air.

Vertical steam-passages R, formed in the body A parallel with the axis of the valve-chambers $d\ d$, connect the steam-inlet passages $l\ l$ at the top of the engine with the rectangular steam-spaces R' R', Figs. 2 and 3, also formed in the body A exteriorly to the valve-chambers and between the spaces in which the abutments J J reciprocate. Said spaces R' are inclosed by the end plates U and are connected with the spaces behind the abutments J J by small openings r r. Live steam from the inlets L l passes through the passages R, spaces R', and openings r, and is thus admitted behind the sliding abutments J J, working across each of the annular steam-chambers b c. When one abutment advances, its fellow is retracted, the steam following behind the advancing abutment and pressing it firmly against the inner surface of the annular steam-chamber. Drainage is provided for the water of condensation from the bottom of these connected passages by removable screw-plugs v, Fig. 2.

Tapering bushings T surround the main shaft G within the sleeve-like axial extensions on the caps B and C, and a similar bushing may be introduced where said shaft passes through the sleeve connecting the side walls of the exhaust-chamber. Screws t, Fig. 3, serve to hold these bushings in position when properly adjusted.

I claim as my invention—

1. In a compound rotary engine, a body or casing consisting of a single integral casting having a central cavity serving as an exhaust-chamber, circular lateral recesses at the sides of said cavity, and a vertical cylindrical valve-chamber at each edge thereof, and provided with a steam-inlet above and a steam-outlet below said cavity, substantially as set forth.

2. In a compound rotary engine, a body or casing A, consisting of an integral casting having a central cavity X, to serve as an exhaust-chamber, circular recesses a, a, at the sides of said cavity, vertical, cylindrical valve-chambers d, d, at each edge thereof, lateral steam-passages l, l, in the upper portion of said casting, vertical steam-passages R, R, parallel with the axis of said valve-chambers, and connecting said passages l, l, with recesses R', R', formed in extensions of said casting exterior to said valve-chambers, substantially as set forth.

3. In a compound rotary engine, the shell or body A, having centrally the exhaust-chamber X, and at each side thereof the circular flanges A' surrounded by deep annular grooves, in combination with the removable caps B and C bolted to said body, formed with inwardly-extending flanges carrying adjustable rings B' C' coinciding with the flanges A', thereby inclosing the annular steam-chambers b and c, substantially as set forth.

4. In a compound rotary engine, the shell or body A having a central exhaust-chamber, an annular steam-chamber at each side and a cylindrical valve-chamber at each edge of the exhaust-chamber, and an axial opening for the main shaft, in combination with radial disks fixed on said shaft and extending marginally to the annular steam-chambers, and with piston-blocks E mounted on said disks, in and adapted to traverse said steam-chambers, substantially as set forth.

5. In a compound rotary engine, the shell or body A having two annular steam-chambers of unequal capacity, and piston-blocks therein mounted on rotatable disks secured on the main shaft, in combination with vertically-reciprocating valves working in valve-chambers located between said annular chambers and having ports opening into the smaller chamber, said valves having spiral peripheral passages adapted to transfer steam from the smaller to the larger chamber, and from the larger chamber to the exhaust, substantially as set forth.

In testimony whereof I have signed my name to this specification, in the presence of two subscribing witnesses, on this 29th day of July, A. D. 1896.

FELIX P. CANFIELD.

Witnesses:
A. H. SPENCER,
N. K. BAKER.